US011106909B2

(12) United States Patent
Guan et al.

(10) Patent No.: US 11,106,909 B2
(45) Date of Patent: Aug. 31, 2021

(54) RECOGNIZING CARBON-SAVING BEHAVIORS FROM IMAGES (71) Applicant: Advanced New Technologies Co., Ltd., Grand Cayman (KY)

(72) Inventors: Weigang Guan, Hangzhou (CN); Xiang Deng, Hangzhou (CN); Kang Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/135,988

(22) Filed: Dec. 28, 2020

(65) Prior Publication Data

US 2021/0117675 A1 Apr. 22, 2021

Related U.S. Application Data (63) Continuation of application No. 16/805,525, filed on Feb. 28, 2020, now Pat. No. 10,878,239, which is a continuation of application No. PCT/CN2018/111852, filed on Oct. 25, 2018.

(30) Foreign Application Priority Data

Dec. 14, 2017 (CN) .......................... 201711334828.0

(51) Int. Cl.
*G06K 9/00* (2006.01)
*G06Q 30/02* (2012.01)

(52) U.S. Cl.
CPC ..... *G06K 9/00624* (2013.01); *G06Q 30/0208* (2013.01); *G06Q 30/0217* (2013.01)

(58) Field of Classification Search
CPC .......... G06Q 30/0208; G06Q 30/0217; G06K 9/00624; G06K 9/62
See application file for complete search history.

(56) References Cited

U.S. PATENT DOCUMENTS

| 10,025,950 B1* | 7/2018 | Avasarala ............ G06K 9/6223 |
| 10,878,239 B2 | 12/2020 | Guan et al. |
| 2011/0055092 A1 | 3/2011 | Fargano et al. |

(Continued)

FOREIGN PATENT DOCUMENTS

| CN | 103745238 | 4/2014 |
| CN | 104732654 | 6/2015 |

(Continued)

OTHER PUBLICATIONS

Crosby e al., "BlockChain Technology: Beyond Bitcoin," Sutardja Center for Entrepreneurship & Technology Technical Report, Oct. 16, 2015, 35 pages.

(Continued)

*Primary Examiner* — Brenda C Bernardi
(74) *Attorney, Agent, or Firm* — Fish & Richardson P.C.

(57) ABSTRACT

The present specification discloses a data processing method, apparatus, and equipment. The method includes: obtaining an image sent by a user, wherein the image to is collected by the user for a merchant; identifying carbon-saving behavior of the merchant, comprising processing the image using a trained image recognition model; and determining, based on the carbon-saving behavior, a value representing an amount of carbon saved by the merchant.

15 Claims, 6 Drawing Sheets

(56) References Cited

U.S. PATENT DOCUMENTS

| | | |
|---|---|---|
| 2012/0101883 A1 | 4/2012 | Akhter et al. |
| 2013/0035973 A1 | 2/2013 | Desai et al. |
| 2015/0189233 A1 | 7/2015 | Carpenter et al. |
| 2016/0167233 A1 | 6/2016 | Zhang et al. |
| 2020/0202126 A1 | 6/2020 | Guan et al. |

FOREIGN PATENT DOCUMENTS

| | | |
|---|---|---|
| CN | 106709525 | 5/2017 |
| CN | 107247946 | 10/2017 |
| CN | 107256386 | 10/2017 |
| CN | 108229337 | 6/2018 |
| TW | 201118789 | 6/2011 |
| TW | 201229933 | 7/2012 |
| TW | 201347538 | 11/2013 |

OTHER PUBLICATIONS

Guzman et al, "CarbonKit: A Technological Platform tbr Personal Carbon Tracking," ResearchGate, Aug. 2016,, 26 pages.
International Preliminary Report on Patentability in PCT Appln No. PCT/CN2018/111852, dated Jun. 16, 2020, 10 pages (with English translation).
International Search Report and Written Opinion in PCT Appln. No. PCT/CN2018/111852, dated Jan. 30, 2019, 9 pages (with English translation of search report).
Nakamoto, "Bitcoin: A Peer-to-Peer Electronic Cash System," www.bitcoin.org, 2005, 9 pages.

\* cited by examiner

RECOGNIZING CARBON-SAVING BEHAVIORS FROM IMAGES

CROSS-REFERENCE TO RELATED APPLICATIONS

This application is a continuation of and claims the benefit of priority of U.S. patent application Ser. No. 16/805,525, filed Feb. 28, 2020, which is a continuation of PCT Application No. PCT/CN2018/111852, filed on Oct. 25, 2018, which claims priority to Chinese Patent Application No. 201711334828.0, filed on Dec. 14, 2017, and each application is hereby incorporated by reference in its entirety.

TECHNICAL FIELD

The present specification relates to the field of computer technologies, and in particular, to a data processing method, apparatus, and equipment.

BACKGROUND

Carbon emission is a general term or abbreviation for greenhouse gas emission. People's daily life can directly or indirectly cause carbon emission such as car exhaust emission, thermal power generation, the use of disposable products, etc. With increase of carbon emission, the degree of damage to the environment where people live is increasingly severe.

Currently, people are reducing carbon emission in many ways, such as developing and promoting cleaner electric vehicles, building more wind and hydroelectric power stations, and manufacturing and using more environment-friendly consumables. Currently, however, there are no effective criteria for carbon-saving quantification that can enable people to understand the carbon-saving condition in real life. Thus, it is difficult to carry out more effective subsequent carbon-saving work based on the carbon-saving condition in real life.

Therefore, how to quantify carbon-saving effectively in people's daily life is an urgent problem to be alleviated.

SUMMARY

The present specification provides a data processing method to alleviate the problem of ineffective quantification of carbon-saving in the existing technology.

The present specification provides a data processing method, including: obtaining an image to be identified sent by a user, where the image to be identified is collected by the user for a merchant; identifying the image to be identified by using a pre-trained image identification model, to identify carbon-saving behavior of the merchant; and determining, based on the carbon-saving behavior, a value representing a carbon-saving amount saved by the merchant.

The present specification provides a data processing apparatus to alleviate the problem of ineffective quantification of carbon-saving in the existing technology.

The present specification provides a data processing apparatus, including: an acquisition module, configured to obtain an image to be identified sent by a user, wherein the image to be identified is collected by the user for a merchant; an identification module, configured to identify the image to be identified by using a pre-trained image identification model to determine carbon-saving behavior of the merchant; and a determining module, configured to determine, based on the carbon-saving behavior, a value representing a carbon-saving amount saved by the merchant.

The present specification provides a data processing equipment to alleviate the problem of ineffective quantification of carbon-saving in the existing technology.

The present specification provides a data processing equipment, including one or more memories and processors, where the memory stores a program that can be executed by the one or more processors to perform the following steps: obtaining an image to be identified sent by a user, where the image to be identified is collected by the user for a merchant; identifying the image to be identified by using a pre-trained image identification model, to identify carbon-saving behavior of the merchant; and determining, based on the carbon-saving behavior, a value representing a carbon-saving amount saved by the merchant.

The present specification provides a data processing method to alleviate the problem of ineffective quantification of carbon-saving in the existing technology.

The present specification provides a data processing method, including: collecting an image to be identified for a merchant; and sending the image to be identified to a server, so the server identifies the image to be identified by using a pre-trained image identification model to identify carbon-saving behavior of the merchant, and determines, based on the carbon-saving behavior, a value representing a carbon-saving amount saved by the merchant.

The present specification provides a data processing apparatus to alleviate the problem of ineffective quantification of carbon-saving in the existing technology.

The present specification provides a data processing apparatus, including: a collecting module, configured to collect an image to be identified for a merchant; and a sending module, configured to send the image to be identified to a server, so the server identifies the image to be identified by using a pre-trained image identification model to identify carbon-saving behavior of the merchant, and determines, based on the carbon-saving behavior, a value representing a carbon-saving amount saved by the merchant.

The present specification provides a data processing equipment to alleviate the problem of ineffective quantification of carbon-saving in the existing technology.

The present specification provides a data processing equipment, including one or more memories and processors, where the memory stores a program that can be executed by the one or more processors to perform the following steps: collecting an image to be identified for a merchant; and sending the image to be identified to a server, so the server identifies the image to be identified by using a pre-trained image identification model to identify carbon-saving behavior of the merchant, and determines, based on the carbon-saving behavior, a value representing a carbon-saving amount saved by the merchant.

The following beneficial effects can be achieved by using at least one of the previously described technical solutions used in the present specification:

In one or more implementations of the present specification, after an image to be identified collected by a user for a merchant is obtained, the image to be identified can be identified by using a pre-trained image identification model to identify carbon-saving behavior of the merchant, and a value representing a carbon-saving amount saved by the merchant can be determined based on the identified carbon-saving behavior.

The carbon-saving behavior of the merchant can be identified based on the image to be identified collected by the user for the merchant, and the carbon-saving of the merchant can be effectively quantified based on the identified carbon-saving behavior of the merchant. Therefore, the merchant can understand the actual carbon-saving condition of the merchant based on the quantified value of carbon-saving, and can effectively carry out the subsequent carbon-saving work based on the known actual carbon-saving condition. These actions have positive impacts on energy conservation and emission reduction in the society.

BRIEF DESCRIPTION OF DRAWINGS

The accompanying drawings described here are used to provide a further understanding of the present specification and constitute a part of the present specification. The illustrative implementations of the present specification and descriptions thereof are intended to describe the present specification, and do not constitute limitations to the present specification. In the accompanying drawings.

DESCRIPTION OF IMPLEMENTATIONS

In the present specification, a user can collect an image of a merchant and send the collected image to a server by using an end-user equipment, so the server quantifies carbon-saving behavior of the merchant based on the image sent by the user. Information included in the image and related to the carbon-saving behavior of the merchant can be collected by the user actively for the carbon-saving behavior of the merchant. Or when the user is active in the merchant, items related to the carbon-saving behavior of the merchant are incidentally collected in the process of collecting other information. For example, when a user is having a meal in the merchant, non-disposable chopsticks are collected when the user takes a photo of the food. The non-disposable chopsticks mentioned here are the items related to the carbon-saving behavior of the merchant.

The motivation of the user for helping the merchant to increase the quantified value of the carbon-saving behavior in a deceptive way is relatively low, so the possibility of the merchant to cheat in order to increase the quantified value of the carbon-saving behavior can be effectively reduced by using the image collected by the user for the merchant to quantify the carbon-saving behavior of the merchant.

In the present specification, an execution body for quantifying of the merchant can be an end-user equipment, a server, or other equipments. To facilitate description of the data processing method provided in the present specification, a server is used as an example in the following description.

To enable a person skilled in the art to better understand technical solutions in one or more implementations of the present specification, the following clearly describes the technical solutions in one or more implementations of the present specification with reference to the accompanying drawings in one or more implementations of the present specification. Apparently, the described implementations are merely a part rather than all of the implementations of the present specification. All other implementations obtained by a person of ordinary skill in the art without creative efforts shall fall within the protection of the present specification, based on the implementations of the present specification.

Figure 1:
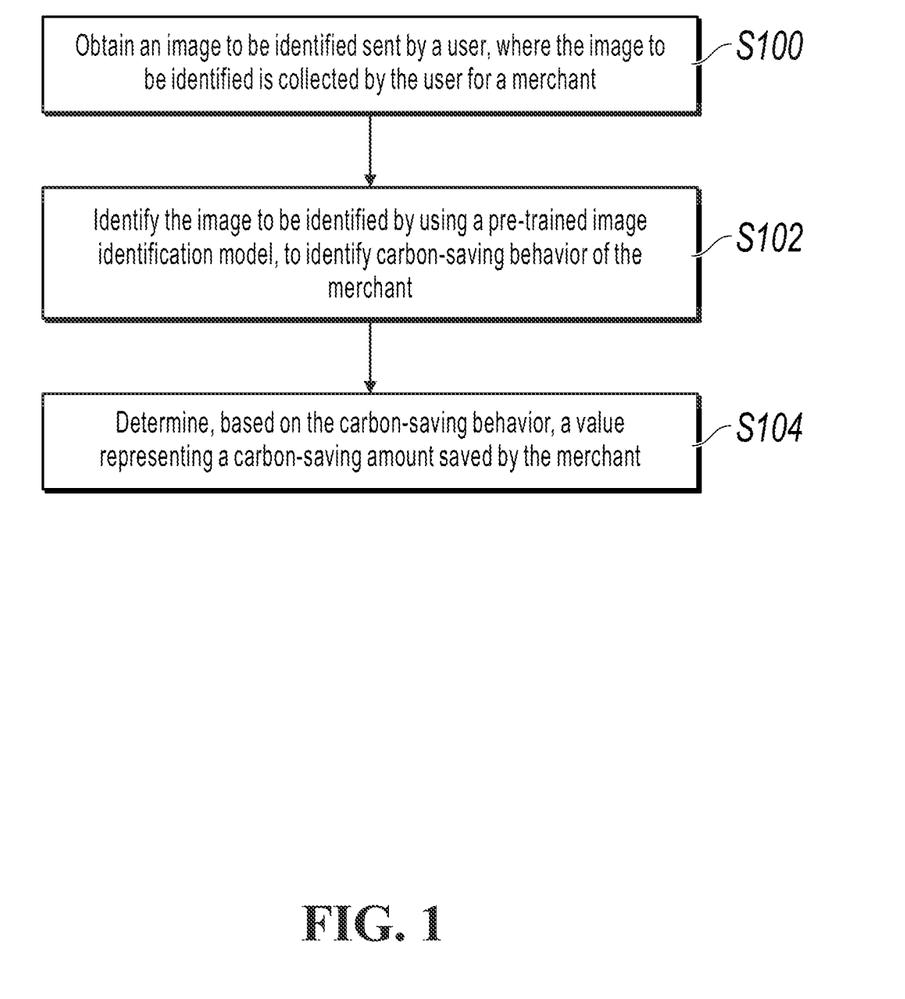
FIG. 1 is a schematic diagram illustrating a data processing process, according to an implementation of the present specification.

FIG. 1 is a schematic diagram illustrating a data processing process, according to one implementation of the present specification. The process includes the following steps:

S100: Obtain an image to be identified sent by a user.

In the present specification, the user can collect an image of a merchant to obtain an image to be identified, and send the image to be identified to a server, so the server can identify the obtained image to be identified. The image to be identified mentioned here can refer to an image that is collected by the user and includes information related to carbon-saving behavior of the merchant. The image to be identified can be in a video form or can be in a picture form. The carbon-saving behavior mentioned here can be divided into two types: One type refers to a merchant takes positive actions to promote carbon-saving such as using non-disposable tableware and environment-friendly furniture, and the other refers to the merchant takes negative actions that do not promote carbon-saving such as using disposable tableware and excessive coal burning. Image collection conducted by the user for the carbon-saving behavior of the merchant can be shown in FIG. 2.

Figure 2:
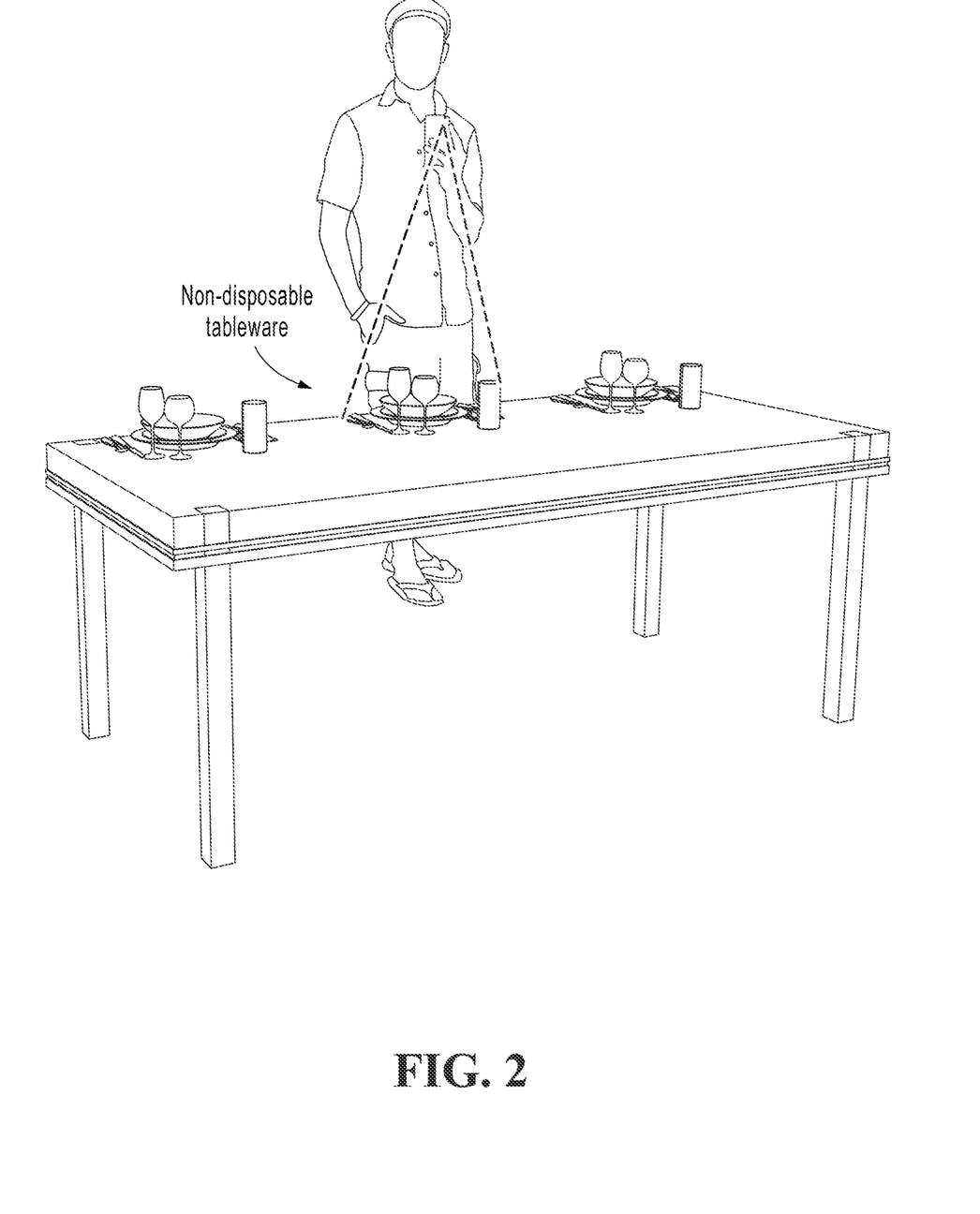
FIG. 2 is a schematic diagram illustrating image collection by a user for a merchant, according to an implementation of the present specification.

FIG. 2 is a schematic diagram illustrating image collection by a user for a merchant, according to an implementation of the present specification.

Assume that when the user is having a meal in a merchant and finds that tableware provided by the merchant is non-disposable, the user can collect, by using a mobile phone, an image of the non-disposable tableware provided by the merchant, to obtain an image to be identified, and send the image to be identified to the server for identification.

S102: Identify the image to be identified by using a pre-trained image identification model to identify carbon-saving behavior of the merchant.

After obtaining the image to be identified sent by the user by using an end-user equipment, the server can identify the image to be identified by using the pre-trained image identification model. The image identification model can be obtained manually based on a large quantity of collected training samples. The image identification model mentioned here can use common identification algorithms such as MobileNet and Faster RCNN. The used identification algorithms are not limited here.

It can be seen from step S100 that the carbon-saving behavior of the merchant can be divided into two types. Therefore, in the present specification, the server can identify a specific type of the carbon-saving behavior of the merchant from the obtained image to be identified by using this image identification model. For example, when the server identifies the presence of a chopstick sterilizer from the image to be identified by using the pre-trained image identification model, the server can determine that the carbon-saving behavior of the merchant is positive behavior that promotes carbon-saving.

In addition to determining the type of the carbon-saving behavior of the merchant by using the image to be identified sent by the user, the server can also determine a specific form of the carbon-saving behavior of the merchant. For example, when the server identifies an energy-saving light bulb from the image to be identified by using the image identification model, the server can determine that a specific form of carbon-saving behavior implemented by restaurant is positive behavior of using an energy-saving light bulb. When the server identifies a chopstick sterilizer from the image to be identified by using the image identification model, the server can determine that the specific form of the carbon-saving behavior of the restaurant is positive behavior of providing non-disposable chopsticks (because, in general, the use of the chopstick sterilizer by the restaurant indicates that the restaurant provides non-disposable chopsticks, while providing non-disposable chopsticks indicates that the restaurant increases the carbon-saving amount).

For another example, when the server identifies bamboo furniture from the image to be identified by using the image identification model, the server can determine that the specific form of the carbon-saving behavior of the merchant is positive behavior of using bamboo furniture (in general, bamboos grow faster than trees, so the use of bamboo furniture can reduce the felling of trees, decreasing the felling of trees increases the absorption of greenhouse gases by trees which in turn improves the carbon saving from the side).

In the present specification, if the server is unable to identify the carbon-saving behavior of the merchant from the obtained image to be identified by using the pre-trained image identification model, the server can send a labeling request to the user, so the user labels the image to be identified that was sent to the user. The server can determine the carbon-saving behavior of the merchant based on the labeled information sent by the user.

For example, assume that the user collects an image of the chopsticks sterilizer and sends the obtained image to be identified to the server. When the server is unable to identify the carbon-saving behavior of the merchant from the image to be identified by using the pre-trained image identification model, the server can send a labeling prompt to the user. After seeing the labeling prompt sent by the server, the user can send the labeled information of the chopsticks sterilizer to the server by using the end-user equipment, so the server determines the carbon-saving behavior of the merchant based on the labeled information (the type of the carbon-saving behavior of the merchant, the specific form of carbon-saving behavior, etc.). For example, when the received labeled information sent by the user is disposable chopsticks, the server can determine that the carbon-saving behavior of the merchant is negative behavior that does not promote carbon-saving and is specifically in the form of disposable tableware.

Usually, the previous image identification model is manually pre-trained by using a large quantity of training samples. These training samples are usually labeled manually. Therefore, if the image identification model needs to be further adjusted, some training samples need to be determined by manual labeling again. This will greatly consume labor costs and reduce the efficiency of model training.

In the present specification, because the image identification model can be trained by using the labeled information sent by the user, it's equivalent to the user to complete labeling the training samples. As such, the identification ability of the image identification model is improved constantly, the labor costs of the image identification model are greatly reduced, and the efficiency of model training is improved.

S104: Determine, based on the carbon-saving behavior, a value representing a carbon-saving amount saved by the merchant.

After determining the carbon-saving behavior of the merchant, the server can determine the value representing the carbon-saving amount saved by the merchant that matches the carbon-saving behavior. When the carbon-saving behavior of the merchant is positive behavior that promotes carbon-saving, the value representing the carbon-saving amount saved by the merchant can be a positive number, and when the carbon-saving behavior of the merchant is negative behavior that does not promote carbon-saving, the value representing the carbon-saving amount saved by the merchant can be a negative number.

In the present specification, the value representing the carbon-saving amount saved by the merchant can be in the form of bonus point. In other words, the server can determine, based on the carbon-saving behavior of the merchant, a carbon-saving bonus point representing the carbon-saving amount saved by the merchant. The server can add the determined carbon-saving bonus point to a carbon-saving account of the merchant. The carbon-saving account mentioned here can be opened in advance by the merchant. The merchant can submit merchant information to the server in advance to apply for a carbon-saving account. The server can review the merchant information submitted by the merchant and, after determining that the merchant information submitted by the merchant has been reviewed, open the carbon-saving account for the merchant.

After determining the carbon-saving behavior of the merchant, the server can further determine the type of the carbon-saving behavior of the merchant, and then add a carbon-saving bonus point that corresponds to the type to the carbon-saving account of the merchant. For example, assume that when the server determines, based on the identified carbon-saving behavior, that the carbon-saving behavior of the merchant is positive behavior that promotes carbon-saving, the server can add the carbon-saving bonus point that corresponds to the positive behavior to the carbon-saving account of the merchant. When the server determines that the carbon-saving behavior of the merchant is negative behavior that does not promote carbon-saving, the server can deduct the carbon-saving bonus point that corresponds to the negative behavior from the carbon-saving account of the merchant.

After determining the carbon-saving behavior of the merchant, the server can also add, based on the specific form of the carbon-saving behavior, the carbon-saving bonus point that matches the specific form to the carbon-saving account of the merchant. In other words, different specific forms can correspond to different carbon-saving bonus points. When the merchant adopts different forms of carbon-saving behavior, different carbon-saving bonus points can be obtained. For example, when the server determines that the specific form of the carbon-saving behavior of the merchant is use of a chopsticks sterilizer, the carbon-saving bonus point that corresponds to this form can be added to the carbon-saving account of the merchant. For another example, when the server determines that the specific form of the carbon-saving behavior of the merchant is use of disposable tableware, the carbon-saving bonus point that corresponds to this form can be deducted from the carbon-saving account of the merchant.

After determining the specific form of the carbon-saving behavior of the merchant, the server can also determine, by using the specific form, predetermined algorithm and other information, the carbon-saving bonus point that needs to be added to the carbon-saving account of the merchant. The other information mentioned here can refer to information such as a credit rating of the user and number of good reviews on carbon-saving by the merchant. When the server determines, based on an image to be identified sent by the user, that carbon-saving behavior of a merchant is positive behavior that promotes carbon-saving, it can be considered as one good review on carbon-saving by the merchant.

Certainly, the server can also determine the carbon-saving bonus point in another way and add the point to the carbon-saving account of the merchant. Details are omitted here.

While adding the determined carbon-saving bonus point to the carbon-saving account of the merchant, the server can also determine the contribution level of the user who sends the image to be identified, and then adding the contribution level to an account of the user, and/or sending a virtual item that corresponds to the contribution level to the user.

The server can determine the contribution degree of the user in several ways. For example, the positive carbon-saving behavior can include several specific forms, and different specific forms correspond to different contribution degrees. Therefore, the server can determine a corresponding contribution degree based on a determined specific form of carbon-saving behavior, or determine a corresponding contribution degree based on the credit rating of the user. Certainly, the server can also determine the contribution degree of the user in another way. Details are omitted here.

There can be many forms of the previous contribution degrees, such as bonus point form and red packet form. The previous virtual item can also have many forms, for example, the server can issue coupons to the user, or some service VIP membership to the user based on a time limit.

To further facilitate the positive carbon-saving behavior of the merchant, the server can provide many convenient services to the merchant based on the carbon-saving bonus point in the carbon-saving account of the merchant. For example, when the server determines that the carbon-saving bonus point in the carbon-saving account of the merchant exceeds a specified score or reaches a specified ranking, the server can display the information of the merchant on the merchant recommendation home page to further promote the merchant. For another example, when the carbon-saving bonus point in the carbon-saving account of the merchant exceeds the specified score, the loan limit of the merchant can be increased. Certainly, the server can provide many other convenient services to the merchant based on the carbon-saving bonus point of the merchant. Details are omitted here.

It can be seen from the previous method that the carbon-saving behavior of the merchant can be identified based on the image to be identified collected by the user for the merchant, and the carbon-saving of the merchant can be effectively quantified based on the identified carbon-saving behavior of the merchant. Therefore, the merchant can understand the actual carbon-saving condition of the merchant based on the quantified value of carbon-saving, and can effectively carry out the subsequent carbon-saving work based on the known actual carbon-saving condition. These actions have positive impacts on energy conservation and emission reduction in the society.

Furthermore, the server can train and adjust the image identification model by using the labeled information sent by the user and the image to be identified from which the carbon-saving behavior is not identified. As such, the labor costs are greatly reduced and the efficiency of the model training is improved.

In addition, the carbon-saving behavior of the merchant enables the merchant to obtain the corresponding carbon-saving bonus point, and the server can provide convenience services for the merchant based on the carbon-saving bonus point in the carbon-saving account of the merchant. Therefore, with the popularization of the carbon-saving account among the merchants and the incentive mechanism brought by the carbon-saving bonus point in the carbon-saving account, the positive carbon-saving behavior can be promoted more effectively, which has more positive impacts on the living environment.

In the present specification, the server needs to quantify the carbon-saving of the merchant based on the image to be identified sent by the user. Therefore, after receiving the image to be identified sent by the user in step S100 shown in FIG. 1, the server needs to determine which merchant is involved in the image to be identified, and determines, based on the image to be identified, a value representing a carbon-saving amount saved by the merchant. In the present specification, there can be many ways for the server to determine the merchant that corresponds to the image to be identified. For example, when the user rates a merchant by using a mobile phone, the user can send the collected image to be identified to the server by using the rating page of the merchant. As such, the server adds, based on the image to be identified, the determined carbon-saving bonus point to the carbon-saving account of the merchant rated by the user.

For another example, the user can send the collected image to be identified to the server when making electronic payment. The server can add, based on the identified carbon-saving behavior from the image to be identified, the carbon-saving bonus point that corresponds to the carbon-saving behavior to the carbon-saving account of the merchant that the user pays to.

For another example, when collecting the carbon-saving behavior of the merchant, the end-user equipment can determine location information on the basis of collecting carbon-saving behavior, and send the collected image to be identified and the determined location information to the server. The server can add the carbon-saving bonus point determined based on the image to be identified to the carbon-saving account of a merchant that corresponds to the location information. Certainly, the merchant that corresponds to the previous image to be identified can also be determined in another way. Details are omitted here.

In the present specification, the end-user equipment can send the collected image to be identified, a merchant identifier, and the location information that collection of the image to be identified is based to the server. The server can identify the image to be identified when determining that the location information matches the location of a merchant that corresponds to the merchant identifier, and add, based on the identified carbon-saving behavior, the carbon-saving bonus point that corresponds to the carbon-saving behavior to the carbon-saving account of the merchant.

The purpose is to prevent some merchants from cheating by collecting irrelevant images to be identified, like collecting images to be identified of other merchants. It can be seen from the previous method that even if some merchants collect the images to be identified of other merchants to cheat, the server adds, based on the location information that collection of the images to be identified is based, the determined carbon-saving bonus point to the carbon-saving account of the merchant that corresponds to the location information, this effectively reduces the possibility of fraud by the merchant.

In the present specification, it is possible for the server to wrongly determine the carbon-saving behavior of the merchant by using the labeled information because the previous labeled information obtained by the server is determined by the user subjectively. The server determines, based on the carbon-saving behavior determined by using the wrong labeled information, the value representing the carbon-saving amount saved by the merchant, which can cause loss to the merchant or another merchant.

To reduce the adverse impacts of the previous problem, in the present specification, when the server needs to determine the carbon-saving behavior of the merchant based on the labeled information sent by the user, the server can multiply a reference value that corresponds to the carbon-saving behavior by a determined confidence coefficient, and determine the product of the two as the value representing the carbon-saving amount saved by the merchant.

The server can determine the confidence coefficient in many ways. For example, different carbon-saving behavior (or specific forms of carbon-saving behavior) can correspond to different confidence coefficients. The server can determine a corresponding confidence coefficient based on the determined carbon-saving behavior of the merchant (or a specific form of carbon-saving behavior), and then determine, based on the confidence coefficient and the reference value that corresponds to the carbon-saving behavior, the value representing the carbon-saving amount saved by the merchant.

The confidence coefficient mentioned here can be determined manually. For those images to be identified that the server cannot identify the carbon-saving behavior (or the specific form of carbon-saving behavior) by using the image identification model, a server administrator can first determine, based on the labeled information sent by the user, the carbon-saving behavior (or the specific form of carbon-saving behavior) labeled by the user for these images to be identified, and manually identify the images to be identified that correspond to the different carbon-saving behavior (or the specific forms of carbon-saving behavior) labeled by the user, to determine an accurate rate of user labeling the carbon-saving behavior (or the specific form), then determine, based on the determined accurate rate, the confidence coefficient that corresponds to the carbon-saving behavior (or the specific form of carbon-saving behavior).

Certainly, the server not only can determine the confidence coefficient based on the determined carbon-saving behavior (or the specific form of carbon-saving behavior), but also can determine the confidence coefficient based on at least one of user information or merchant information. The user information and the merchant information mentioned here can refer to the credit rating of the user or the merchant, the existing carbon-saving bonus point in the carbon-saving account, etc. Other ways to determine the confidence coefficient are omitted here.

Figure 3:
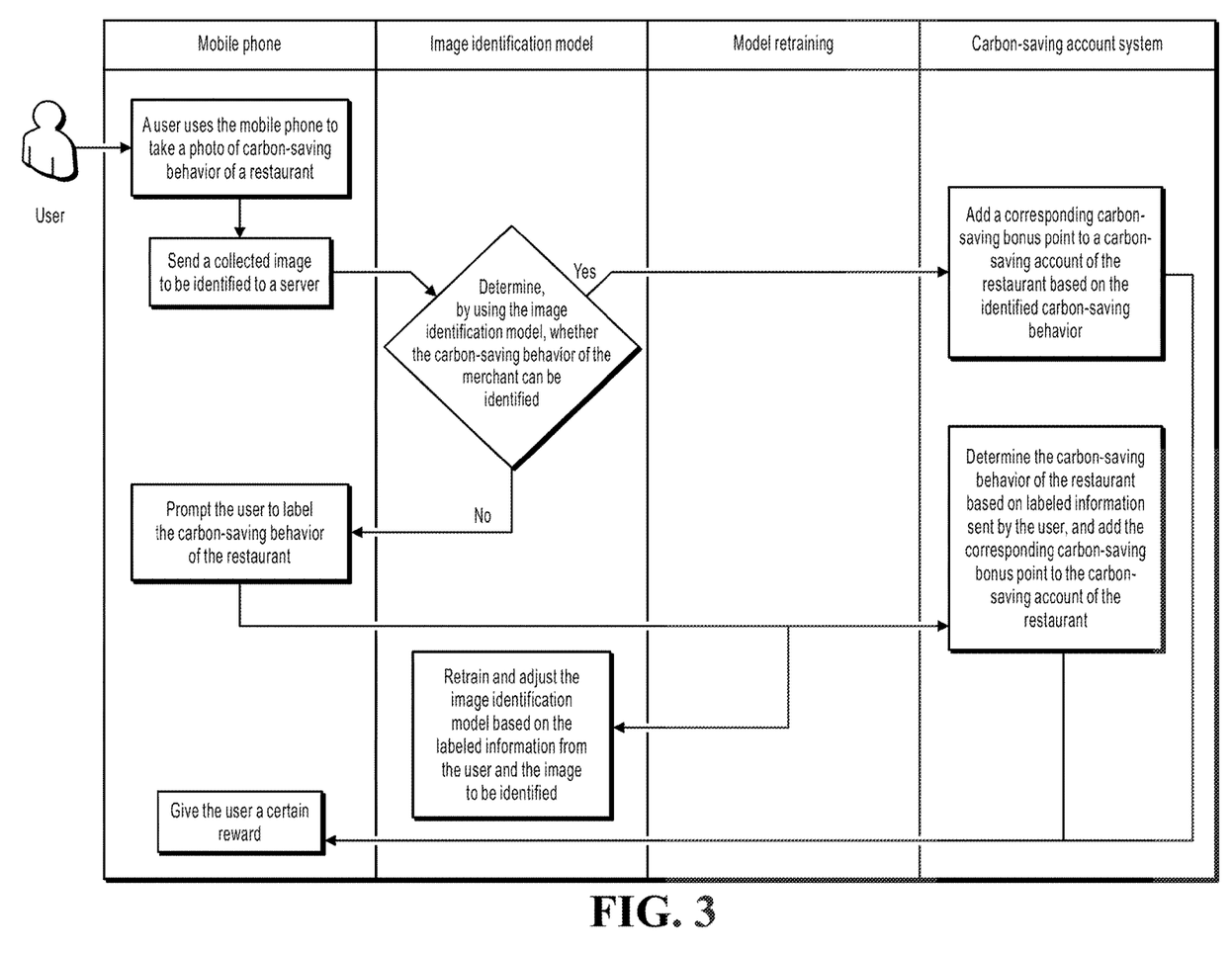
FIG. 3 is a schematic diagram illustrating an entire data processing process, according to an implementation of the present specification.

To further describe the data processing method provided in the present specification, an entire data processing process is described by using a specific example below, as shown in FIG. 3.

FIG. 3 is a schematic diagram illustrating an entire data processing process, according to an implementation of the present specification.

As shown in FIG. 3, a user can obtain a certain reward by collecting images of carbon-saving behavior performed by a merchant, and the merchant can obtain a certain carbon-saving bonus point after the user collects an image to be identified of the merchant. Therefore, the incentive mechanism can stimulate more merchants to implement positive carbon-saving behavior, which forms a virtuous cycle and has positive impacts on energy conversation and emission reduction in the society.

The data processing methods provided in one or more implementations of the specification are described above. Based on the same idea, the specification further provides corresponding data processing apparatus, as shown in FIG. 4 and FIG. 5.

Figure 4:
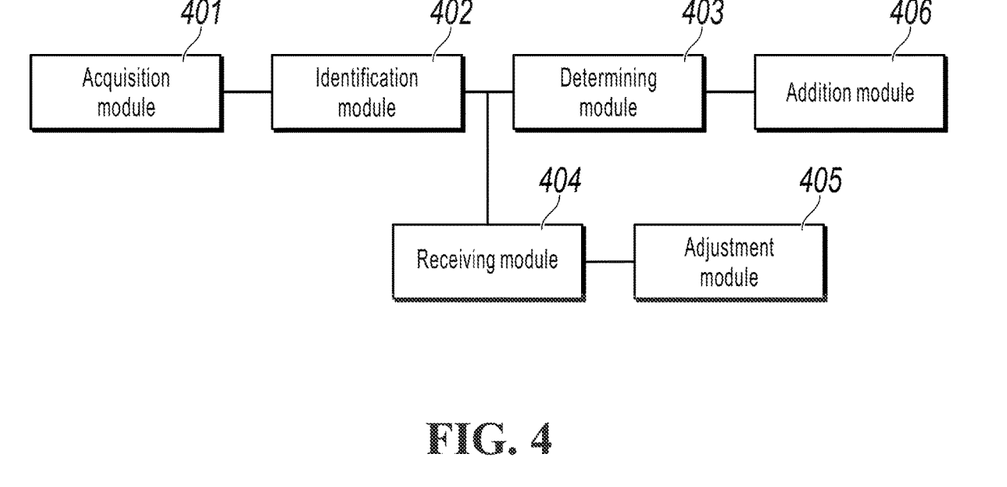
FIG. 4 is a schematic diagram illustrating a data processing apparatus, according to an implementation of the present specification.
Figure 5:
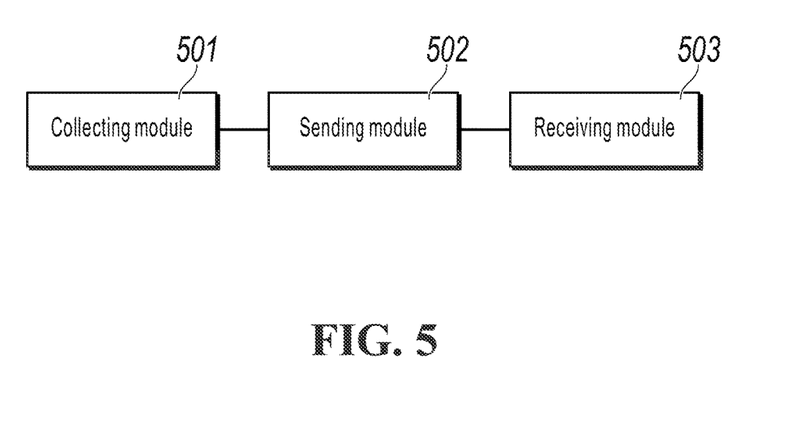
FIG. 5 is a schematic diagram illustrating a data processing apparatus, according to an implementation of the present specification.

FIG. 4 is a schematic diagram illustrating a data processing apparatus, according to an implementation of the present specification. The apparatus includes: an acquisition module 401, configured to obtain an image to be identified sent by a user, where the image to be identified is collected by the user for a merchant; an identification module 402, configured to identify the image to be identified by using a pre-trained image identification model, to determine carbon-saving behavior of the merchant; and a determining module 403, configured to determine, based on the carbon-saving behavior, a value representing a carbon-saving amount saved by the merchant.

The apparatus further includes: a receiving module 404, configured to: when the carbon-saving behavior of the merchant is not identified from the image to be identified by using the image identification model, receive labeled information that corresponds to the image to be identified and that is sent by the user, where the labeled information comprises the carbon-saving behavior of the merchant labeled by the user for the image to be identified; the determining module 403 is configured to determine, based on the received labeled information, the value representing the carbon-saving amount saved by the merchant; and the determining module 403 is configured to determine the carbon-saving behavior included in the labeled information; determine a reference value that corresponds to the carbon-saving behavior; and determine, based on the product of the reference value and a confidence coefficient, the value representing the carbon-saving amount saved by the merchant.

The apparatus further includes: an adjustment module 405, configured to adjust the image identification model based on the image to be identified and the labeled information; and the determining module 403 is configured to determine a contribution degree of the user, and providing the user with a virtual item that corresponds to the contribution degree, and/or adding the contribution degree to an account of the user.

The value representing the carbon-saving amount saved by the merchant includes a carbon-saving bonus point representing the carbon-saving amount saved by the merchant.

The apparatus further includes: an addition module 406, configured to add the carbon-saving bonus point to a carbon-saving account of the merchant.

FIG. 5 is a schematic diagram illustrating a data processing apparatus, according to an implementation of the present specification. The apparatus includes: a collecting module 501, configured to collect an image of a merchant as an image to be identified; and a sending module 502, configured to send the image to be identified to a server, so the server identifies carbon-saving behavior of the merchant from the image to be identified by using a pre-trained image identification model, and determines, based on the carbon-saving behavior, a value representing a carbon-saving amount saved by the merchant.

The apparatus further includes: a receiving module 503, configured to receive a labeling prompt sent by the server, where the labeling prompt is sent to a user when the server does not identify the carbon-saving behavior of the merchant from the image to be identified by using the image identification model; and the sending module 502 is configured to receive labeled information input by the user based on the labeling prompt, and send the labeled information to the server, so the server determines the carbon-saving behavior of the merchant based on the labeled information.

Figure 6:
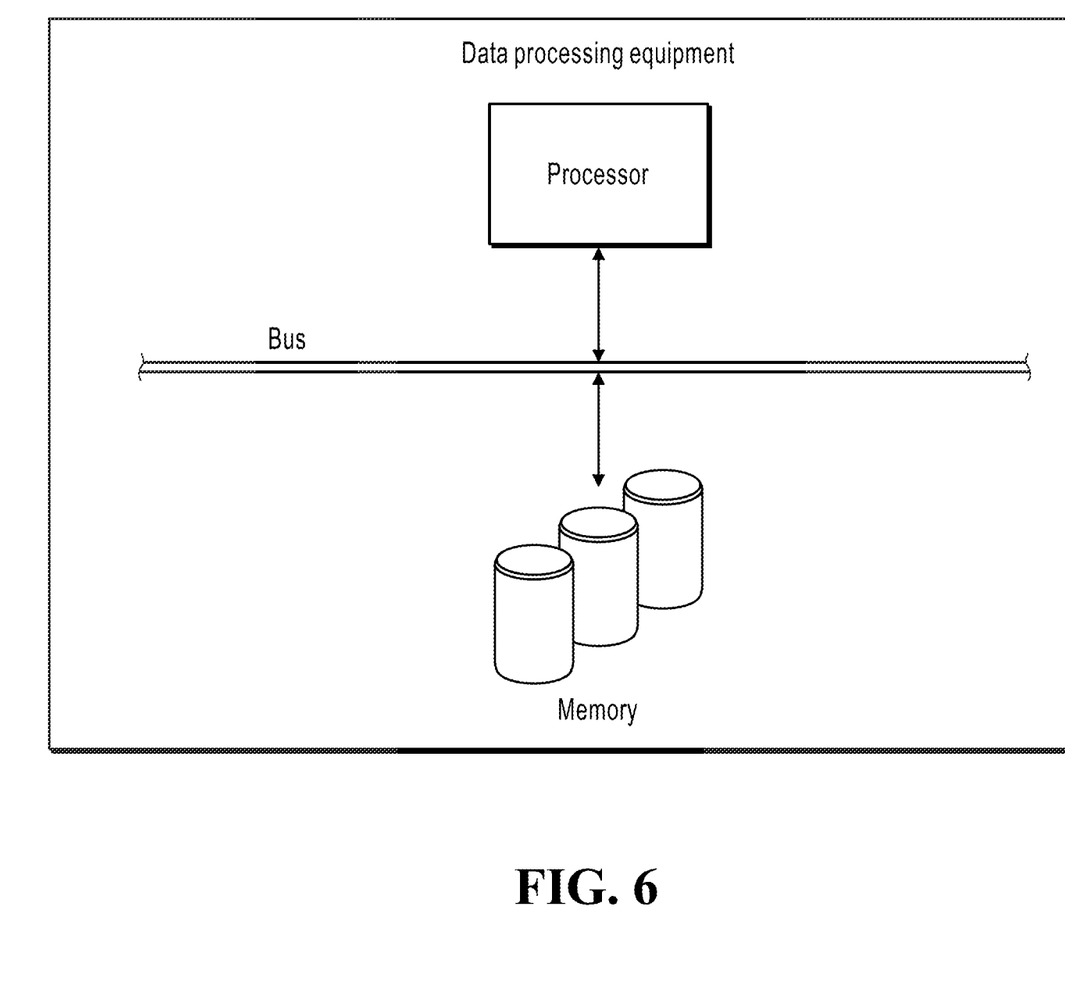
FIG. 6 is a schematic diagram illustrating a data processing equipment, according to an implementation of the present specification.

As shown in FIG. 6, the present specification further correspondingly provides a data processing equipment based on the previous data processing method. The equipment includes one or more memories and processors, and the memory stores a program that is executed by the one or more processors to perform the following steps: obtaining an image to be identified sent by a user, where the image to be identified is collected by the user for a merchant; identifying the image to be identified by using a pre-trained image identification model, to identify carbon-saving behavior of the merchant; and determining, based on the carbon-saving behavior, a value representing a carbon-saving amount saved by the merchant.

Figure 7:
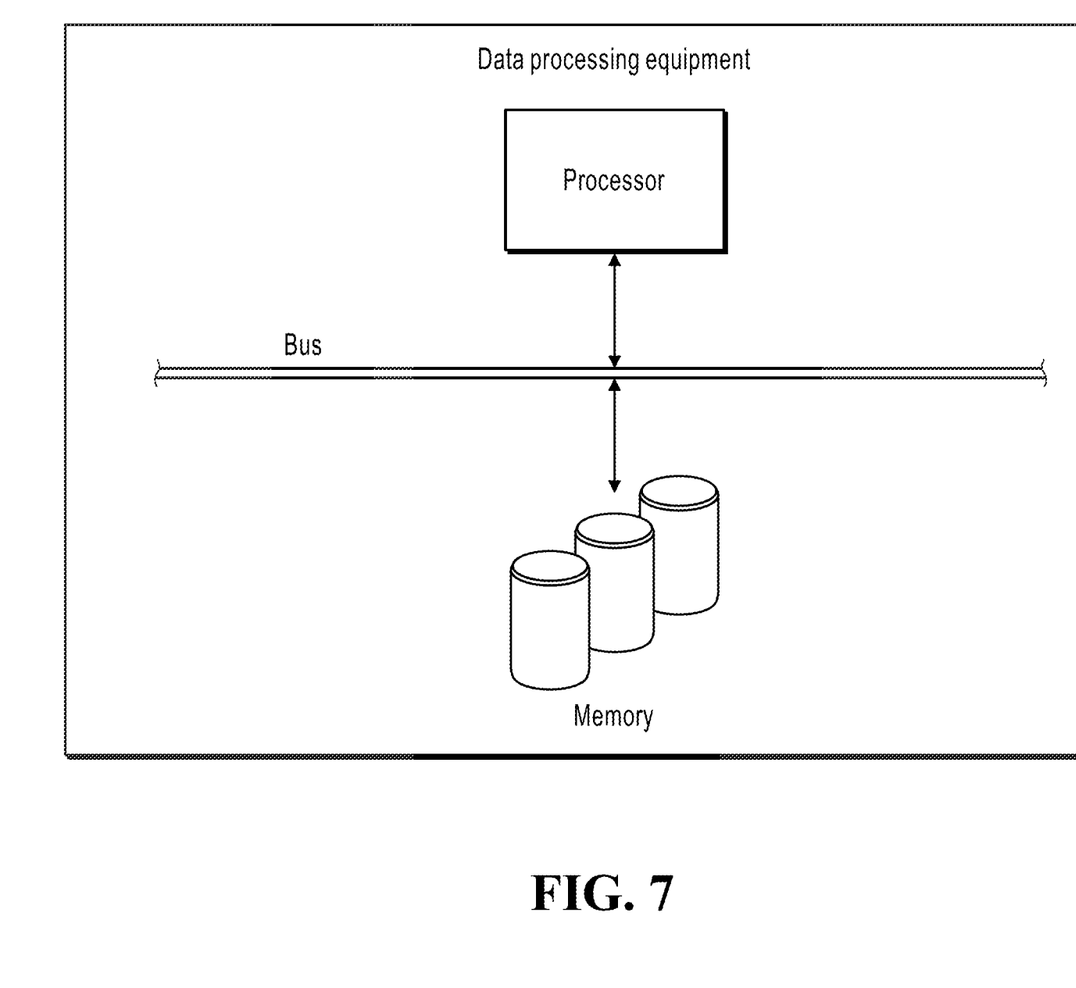
FIG. 7 is a schematic diagram illustrating a data processing equipment, according to an implementation of the present specification.

As shown in FIG. 7, the present specification further correspondingly provides a data processing equipment based on the previous data processing method. The equipment includes one or more memories and processors, and the memory stores a program that is executed by the one or more processors to perform the following steps: collecting an image of a merchant as an image to be identified; and sending the image to be identified to a server, so the server identifies carbon-saving behavior of the merchant from the image to be identified by using a pre-trained image identification model, and determines, based on the carbon-saving behavior, a value representing a carbon-saving amount saved by the merchant.

In one or more implementations of the present specification, after the image to be identified collected by the user for the merchant is obtained, the image to be identified can be identified by using the pre-trained image identification model to identify the carbon-saving behavior of the merchant, and the value representing the carbon-saving amount saved by the merchant can be determined based on the identified carbon-saving behavior.

The carbon-saving behavior of the merchant can be identified based on the image to be identified collected by the user for the merchant, and the carbon-saving of the merchant can be effectively quantified based on the identified carbon-saving behavior of the merchant. Therefore, the merchant can understand the actual carbon-saving condition of the merchant based on the quantified value of carbon-saving, and can effectively carry out the subsequent carbon-saving work based on the known actual carbon-saving condition. These actions have positive impacts on energy conservation and emission reduction in the society.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code also needs to be written in a particular programming language for compilation. The language is referred to as a hardware description language (HDL). There are many types of HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by a computer chip or an entity, or can be implemented by a product with a specified function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that the implementation of the present specification can be provided as a method, a system, or a computer program product. Therefore, the present specification can use a form of hardware only implementations, software only implementations, or implementations with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product based on one or more implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing equipment to generate a machine, so the instructions executed by the computer or the processor of the another programmable data processing equipment generate a device for implementing a specific function in one or more processes in the flowcharts and/or in one or more blocks in the block diagrams.

These computer program instructions can be stored in a computer readable memory that can instruct the computer or the another programmable data processing equipment to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing equipment, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a calculating device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer executable instructions executed by a computer, for example, a program module. Generally, the program module includes a routine, a program, an object, a component, a data structure, etc. executing a specific task or implementing a specific abstract data type. The one or more implementations of the present specification can also be practiced in distributed computing environments. In these distributed computing environments, tasks are executed by remote processing devices that are connected by using a communications network. In a distributed computing environment, the program module can be located in both local and remote computer storage media including storage devices.

The implementations in the present specification are all described in a progressive method. For same or similar parts in the implementations, refer to these implementations. Each implementation focuses on a difference from other implementations. Particularly, a system implementation is basically similar to a method implementation, and therefore, is described briefly. For related parts, references can be made to related descriptions in the method implementation.

Specific implementations of the present application are described above. Other implementations fall within the scope of the appended claims. In some situations, the actions or steps described in the claims can be performed in an order different from the order in the implementations and the desired results can still be achieved. In addition, the process depicted in the accompanying drawings is not necessarily shown in a particular order or a consecutive order to achieve the desired results. In some implementations, multi-tasking and parallel processing are also possible or can be advantageous.

The previous descriptions are merely one or more implementations of the present specification, and are not intended to limit the present specification. For a person skilled in the art, the one or more implementations of the present specification can have various modifications and changes. Any modifications, equivalent substitutions, and improvements made within of the spirit and the principle of one or more implementations of the present specification shall fall within the scope of the claims in the present specification.

What is claimed is:

1. A method, comprising:

deploying, at a server, a trained image recognition model that is configured to process images to generate model outputs that identify a category of any object characterized in the images that relates to reducing carbon footprint;

in response to receiving a new image that is collected by a first user for a merchant and that is uploaded by the first user through a user device in data communication with the server:

prompting the first user to enter labeling information for the new image that identifies user-specified categories that relate to reducing carbon footprint for one or more new objects characterized in the new image;

generating, by the server and based on the new image and the labeling information, new training data for use in adjusting the trained image recognition model;

adjusting the trained image recognition model using the new training data including using the user-specified categories as target outputs to be generated by the trained image recognition model from processing the new image;

receiving another image that is collected by a second user for the merchant and that is uploaded by the second user through another user device in data communication with the server;

using the adjusted trained image recognition model to generate another model output that identifies one or more categories that relate to reducing carbon footprint for one or more other objects characterized in the other image; and determining, by the server and based on the categories identified for the one or more other objects characterized in the other image, a degree of contribution of the merchant with respect to reducing carbon footprint.

2. The method of claim 1, wherein determining the degree of contribution of the merchant with respect to reducing carbon footprint comprises:

determining, based on the categories identified for the one or more other objects characterized in the other image, a numeric value that is an estimate of a change in carbon footprint of the merchant.

3. The method of claim 2, wherein generating the new training data for use in adjusting the trained image recognition model comprises:

determining, based on the labeling information entered by the user, the numeric value that is the estimate of the change in carbon footprint of the merchant;

generating the new training data by using the numeric value as an additional target output; and adjusting the trained image recognition model using the new training data including using the numeric value as the additional target output to be generated by the trained image recognition model from processing the new image.

4. The method according to claim 3, wherein the determining, based on the labeling information entered by user, the numeric value that is the estimate of the change in carbon footprint of the merchant comprises:

determining a reference value that corresponds to the user-specified categories that relate to reducing carbon footprint for the one or more new objects characterized in the new image; and determining, based on computing a product of the reference value and a confidence coefficient, the numeric value that is the estimate of the change in carbon footprint of the merchant.

5. The method according to claim 3, further comprising crediting an account associated with the merchant by an amount corresponding to the numeric value.

6. A non-transitory, computer-readable medium storing one or more instructions executable by a computer system to perform operations comprising:

deploying, at a server, a trained image recognition model that is configured to process images to generate model outputs that identify a category of any object characterized in the images that relates to reducing carbon footprint;

in response to receiving a new image that is collected by a first user for a merchant and that is uploaded by the first user through a user device in data communication with the server:

prompting the first user to enter labeling information for the new image that identifies user-specified categories that relate to reducing carbon footprint for one or more new objects characterized in the new image;

generating, by the server and based on the new image and the labeling information, new training data for use in adjusting the trained image recognition model;

adjusting the trained image recognition model using the new training data including using the user-specified categories as target outputs to be generated by the trained image recognition model from processing the new image;

receiving another image that is collected by a second user for the merchant and that is uploaded by the second user through another user device in data communication with the server;

using the adjusted trained image recognition model to generate another model output that identifies one or more categories that relate to reducing carbon footprint for one or more other objects characterized in the other image; and determining, by the server and based on the categories identified for the one or more other objects characterized in the other image, a degree of contribution of the merchant with respect to reducing carbon footprint.

7. The non-transitory, computer-readable medium according to claim 6, wherein determining the degree of contribution of the merchant with respect to reducing carbon footprint further comprises:

determining, based on the categories identified for the one or more other objects characterized in the other image, a numeric value that is an estimate of a change in carbon footprint of the merchant.

8. The non-transitory, computer-readable medium according to claim 7, wherein generating the new training data for use in adjusting the trained image recognition model comprises:

determining, based on the labeling information entered by the user, the numeric value that is the estimate of the change in carbon footprint of the merchant;

generating the new training data by using the numeric value as an additional target output; and adjusting the trained image recognition model using the new training data including using the numeric value as the additional target output to be generated by the trained image recognition model from processing the new image.

9. The non-transitory, computer-readable medium according to claim 8, wherein the determining, based on the labeling information entered by the user, the numeric value that is the estimate of the change in carbon footprint of the merchant comprises:
   determining a reference value that corresponds to the user-specified categories that relate to reducing carbon footprint for the one or more new objects characterized in the new image; and
   determining, based on computing a product of the reference value and a confidence coefficient, the numeric value that is the estimate of the change in carbon footprint of the merchant.

10. The non-transitory, computer-readable medium according to claim 8, wherein the operations further comprise crediting an account associated with the merchant by an amount corresponding to the numeric value.

11. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   deploying, at a server, a trained image recognition model that is configured to process images to generate model outputs that identify a category of any object characterized in the images that relates to reducing carbon footprint;
   in response to receiving a new image that is collected by a first user for a merchant and that is uploaded by the first user through a user device in data communication with the server:
   prompting the first user to enter labeling information for the new image that identifies user-specified categories that relate to reducing carbon footprint for one or more new objects characterized in the new image;
   generating, by the server and based on the new image and the labeling information, new training data for use in adjusting the trained image recognition model;
   adjusting the trained image recognition model using the new training data including using the user-specified categories as target outputs to be generated by the trained image recognition model from processing the new image;
   receiving another image that is collected by a second user for the merchant and that is uploaded by the second user through another user device in data communication with the server;
   using the adjusted trained image recognition model to generate another model output that identifies one or more categories that relate to reducing carbon footprint for one or more other objects characterized in the other image; and
   determining, by the server and based on the categories identified for the one or more other objects characterized in the other image, a degree of contribution of the merchant with respect to reducing carbon footprint.

12. The computer-implemented system according to claim 11, wherein determining the degree of contribution of the merchant with respect to reducing carbon footprint further comprises:
   determining, based on the categories identified for the one or more other objects characterized in the other image, a numeric value that is an estimate of a change in carbon footprint of the merchant.

13. The computer-implemented system according to claim 12, wherein generating the new training data for use in adjusting the trained image recognition model comprises:
   determining, based on the labeling information entered by the user, the numeric value that is the estimate of the change in carbon footprint of the merchant;
   generating the new training data by using the numeric value as an additional target output; and
   adjusting the trained image recognition model using the new training data including using the numeric value as the additional target output to be generated by the trained image recognition model from processing the new image.

14. The computer-implemented system according to claim 13, wherein the determining, based on the labeling information entered by the user, the numeric value that is the estimate of the change in carbon footprint of the merchant comprises:
   determining a reference value that corresponds to the user-specified categories that relate to reducing carbon footprint for the one or more new objects characterized in the new image; and
   determining, based on computing a product of the reference value and a confidence coefficient, the numeric value that is the estimate of the change in carbon footprint of the merchant.

15. The computer-implemented system according to claim 13, wherein the operations further comprise crediting an account associated with the merchant by an amount corresponding to the numeric value.

* * * * *